United States Patent [19]

Baker

[11] E Patent Number: Re. 33,119

[45] Reissued Date of Patent: Nov. 28, 1989

[54] SELECTIVE TEMPERATURE CONTROL SYSTEM

[75] Inventor: Daniel A. Baker, Minnetonka, Minn.

[73] Assignee: Whirlpool Corporation, Benton Harbor, Mich.

[21] Appl. No.: 168,525

[22] Filed: Mar. 7, 1988

Related U.S. Patent Documents

Reissue of:

[64] Patent No.: 4,888,238
Issued: Dec. 18, 1984
Appl. No.: 317,333
Filed: Nov. 2, 1981

U.S. Applications:

[60] Continuation of Ser. No. 939,551, Dec. 9, 1986, abandoned, which is a division of Ser. No. 108,694, Dec. 31, 1979, Pat. No. 4,315,413.

[51] Int. Cl.[4] ..... G01K 3/00; G01K 7/24; G06F 15/20

[52] U.S. Cl. ..... 374/102; 62/180; 364/557; 374/170; 374/183

[58] Field of Search ..... 374/170, 178, 164, 171, 374/173, 183, 102, 107; 377/25; 368/11; 364/569, 557; 307/117

[56] References Cited

U.S. PATENT DOCUMENTS

| | | | |
|---|---|---|---|
| 2,987,704 | 6/1961 | Gimpel et al. | 374/171 X |
| 3,283,320 | 11/1966 | Blachowicz et al. | 340/347 R |
| 3,462,758 | 8/1969 | Reynal et al. | 340/347 NT |
| 3,475,677 | 7/1967 | Swinehart et al. | 323/21 |
| 3,588,699 | 6/1971 | Pysnik | 364/569 |
| 3,660,834 | 5/1972 | Picot | 340/347 NT |
| 3,702,076 | 11/1972 | Georgi | 374/170 |
| 3,911,374 | 10/1975 | Busse et al. | 331/65 |
| 3,942,718 | 3/1976 | Palmieri | 236/75 R |
| 3,946,200 | 3/1976 | Juodikis | 219/501 X |
| 4,001,676 | 1/1977 | Hile et al. | 73/304 C |
| 4,050,309 | 9/1977 | Junkert et al. | 374/171 |
| 4,089,462 | 5/1978 | Bradford | 236/91 R X |
| 4,090,064 | 5/1978 | Turner | 377/25 |
| 4,121,461 | 10/1978 | Butler et al. | 374/171 |
| 4,122,720 | 10/1978 | Podl | 340/57 X |
| 4,176,556 | 12/1979 | Takenaka | 364/557 X |
| 4,204,729 | 5/1980 | Shimazaka et al. | 374/164 |
| 4,206,872 | 6/1980 | Levine | 236/46 R |
| 4,277,975 | 7/1981 | Pinkham | 374/170 |
| 4,288,853 | 9/1981 | Uesugi | 364/557 |
| 4,297,851 | 11/1981 | Paddock et al. | 340/558 X |
| 4,298,947 | 11/1981 | Tamura et al. | 374/170 X |
| 4,315,413 | 2/1982 | Baker | 62/180 |

OTHER PUBLICATIONS

"Digital Thermometer", by M. Plant, Practical Electronics, Aug. 1978, pp. 896–900.

*Primary Examiner*—Daniel M. Yasich
*Attorney, Agent, or Firm*—Wood, Dalton, Phillips, Mason & Rowe

[57] ABSTRACT

A method and apparatus is disclosed for determining the temperature to which a thermistor is exposed. A capacitor is charged through a reference resistor and the length of time required to charge the capacitor to a predetermined level is measured to obtain a reference charge time. The capacitor is discharged, and then charged through the thermistor and the length of time required to charge the capacitor to the predetermined level through the thermistor is measured to obtain a temperature charge time. The temperature to which the thermistor is exposed is determined by computing the difference between the reference charge time and the temperature charge time divided by the sum of the times.

19 Claims, 10 Drawing Sheets

SELECTIVE TEMPERATURE CONTROL SYSTEM

Matter enclosed in heavy brackets [ ] appears in the original patent but forms no part of this reissue specification; matter printed in italics indicates the additions made by reissue.

This *application is a continuation of application Ser. No. 939,551, filed 12/9/86, and now abandoned, which is a reissue of application Ser. No. 317,333, filed 11/2/81, now U.S. Pat. No. 4,488,823, which* is a division of application Ser. No. 108,694, filed Dec. 31, 1979, now U.S. Pat. No. 4,315,413, issued Feb. 16, 1982.

BACKGROUND OF THE INVENTION

The present invention relates to a selective temperature control system for use in a space cooling device, such as a room air conditioner, in which the compressor energization and the fan speed are adjusted automatically in response to the difference between the ambient temperature and a set point temperature.

In many air conditioning systems, the compressor motor and evaporator fan motor are variable in speed by using a user-set control potentiometer and a feedback circuit which senses the motor speeds. Such systems are responsive to temperature sensors or thermostats to vary the compressor motor speed and the evaporator fan speed.

In some prior art systems, to protect the evaporator coils from freezing and also to sense the ambient temperature, a vapor bulb thermostat has been mounted on a plastic block which in turn is mounted on the evaporator coils so as to sense both the evaporator temperature and the ambient temperature. However, such attempts to sense both temperatures using only one sensor results in large temperature swings within the cooled room because of the mixing of the evaporator and ambient temperatures.

Some air conditioning controls also employ the use of a compressor lockout, which is designed to prevent the compressor from short cycling and from locking up. Often this is achieved by the use of a timer which insures that the compressor will remain off for a predetermined amount of time. Other systems employ the use of a percentage timer which insures that the compressor is off for a fixed percentage of time within a complete compressor cycle.

SUMMARY OF THE INVENTION

In accordance with the present invention, a selective temperature control system for a room air conditioner utilizes two separate temperature sensors, such as thermistors. An evaporator temperature sensor monitors the temperature of the evaporator and, in the event that the temperature of the evaporator falls below a pre-determined limit, the control system turns off the compressor to prevent significant frost buildup on the evaporator. An ambient temperature sensor is located so as to sense the average temperature of the room, rather than a mixture of the evaporator and the ambient temperatures. Temperature swings within the room are minimized because the temperature of the evaporator does not affect the ambient temperature sensor.

The temperature control circuit includes a microcomputer chip. This allows the use of a minimum number of hardwired components, thereby reducing space requirements. In addition, LED indicators are used to indicate the status of the air conditioning control.

The ambient and evaporator temperatures are determined by a linearization computation which utilizes a reference resistor. A capacitor is sequentially charged through the reference resistor, the ambient sensor and the evaporator sensor by a voltage source. The time required for each to charge the capacitor to a particular voltage is measured and the charging times are used to calculate the ambient and evaporator temperatures.

In the present invention, the fan speed is varied in response to the difference between the ambient temperature and a set point temperature which is determined by the position of a slide switch. The control logic of the microcomputer scans the slide switch to determine which switch position has been selected by the user. The control logic converts the slide switch position into a value proportional to the desired set point temperature to determine the difference between the ambient and the set point temperature.

Other features of the invention will be apparent from the following description and from the drawings. While an illustrative embodiment of the invention is shown in the drawings and will be described in detail herein, the invention is susceptible of embodiment in many forms and it should be understood that the present disclosure is to be considered as an exemplification of the principles of the invention and it is not intended to limit the invention to the embodiment illustrated.

DESCRIPTION OF THE PREFERRED EMBODIMENT

Figure 1:
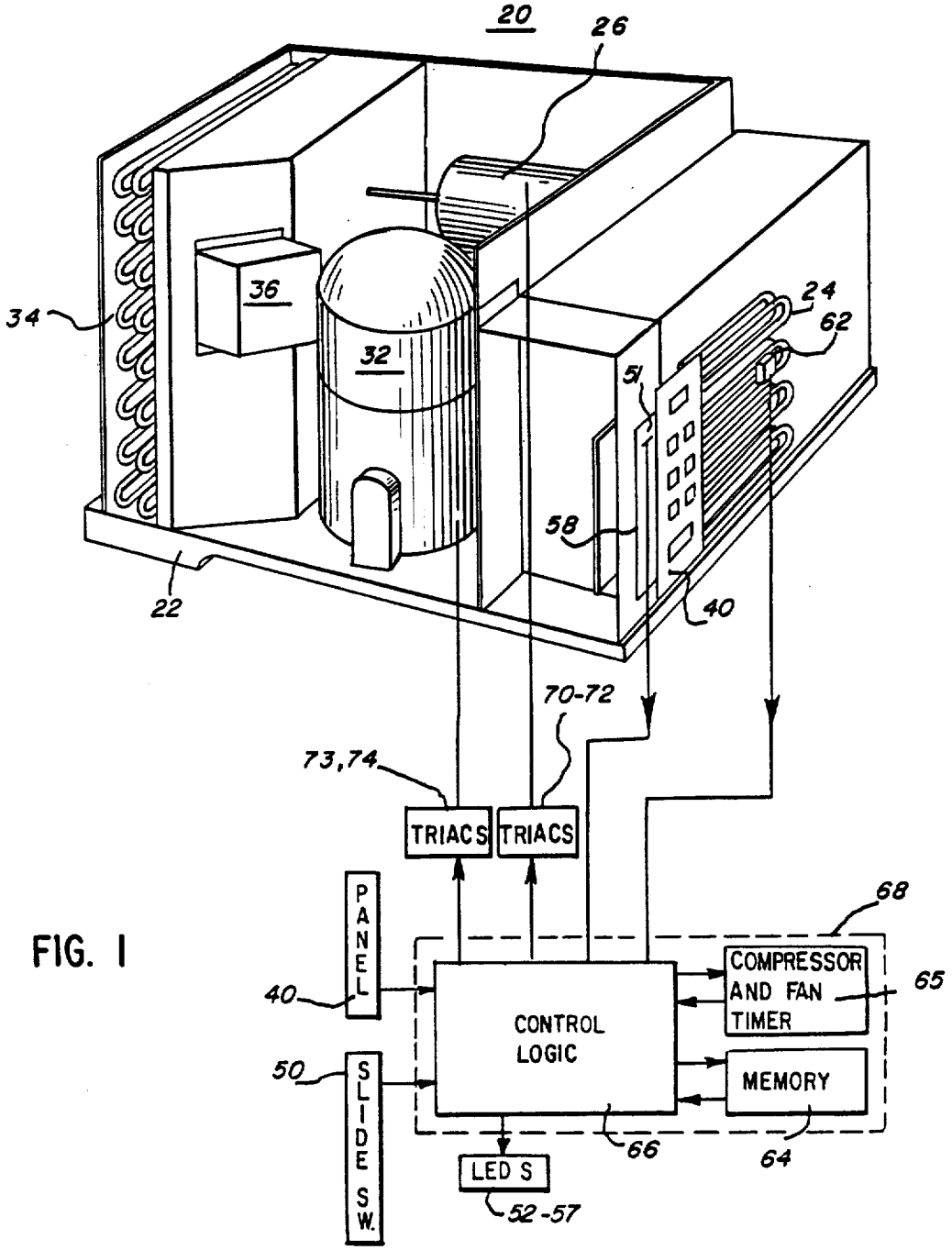
FIG. 1 is a perspective view of an air conditioner and a block diagram of the temperature control system therefor.

Turning to FIG. 1, a space cooling device in the form of a conventional room air conditioning system 20 is illustrated in conjunction with the temperature control system. The air conditioning unit 20 includes a chassis 22 upon which the various components of the air conditioning unit 20 are mounted. Air is cooled as a result of being passed in heat exchange relationship with an evaporator 24 and is forced by a fan 26 through a discharge duct and an outlet grill (not shown) into the room. The cooling apparatus includes a conventional compressor 32, condenser 34 and a heat sink 36 interconnected through tubing to the evaporator 24 to effect the flow of refrigerant thereto.

Figure 2:
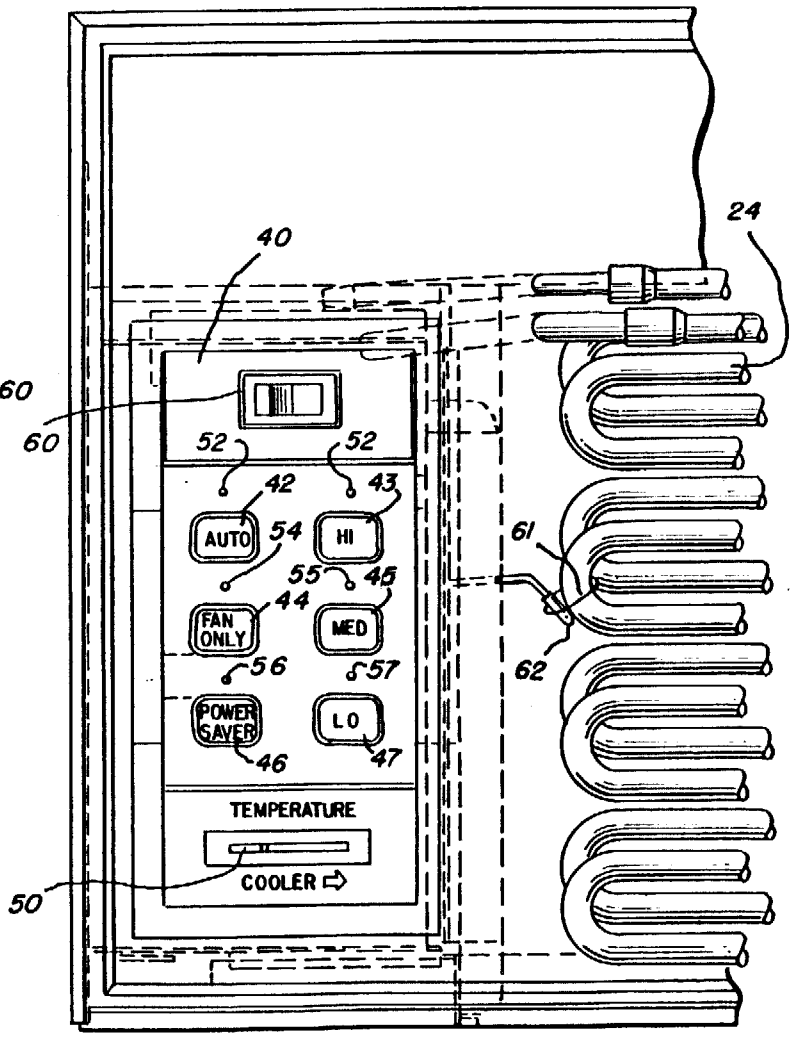
FIG. 2 is an enlarged fragmentary elevational view of the air conditioner showing the location of the control panel and the evaporator sensor.
Figure 3:
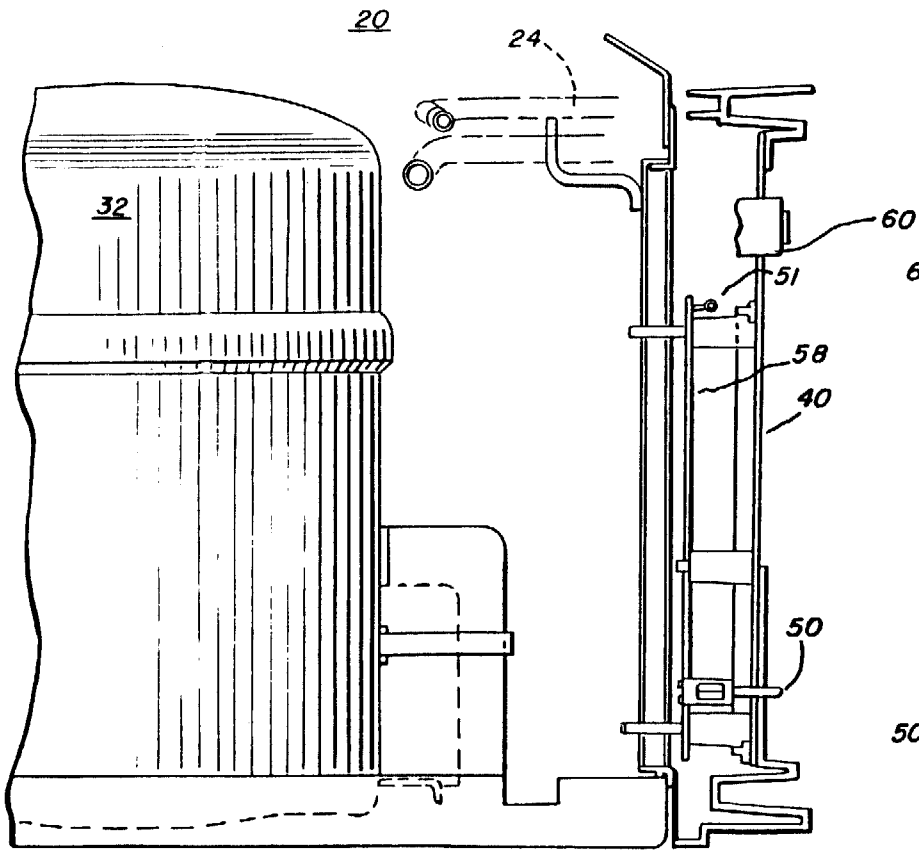
FIG. 3 is an enlarged fragmentary side elevational view of a portion of the air conditioner showing the ambient sensor and the temperature control circuit board.

As seen in FIGS. 2 and 3, a control panel 40, which is located adjacent to the evaporator 24, includes a plurality of switches 42–47 by which the air conditioner is controlled. The control panel 40 also mounts a thermostat slide switch 50 by which the user can select the set point, or desired temperature, of the cooled room. An ambient temperature sensor 51, such as a thermistor, is mounted on the upper portion of a circuit board 58 behind the control panel 40 to be exposed to a temperature which is representative of the average temperature of the room. This location is preferred because the ambient sensor 51 is located sufficiently distant from the evaporator, condenser and compressor so as not to be influenced by their temperatures which would provide a false reading of the ambient temperature. Further, mounting the ambient sensor 51 on the circuit board 58 minimizes wiring difficulties and positions the sensor 51 near the ambient air.

Associated with the switches 42–47 are a plurality of visual indicators in the form of light emitting diodes, or LED's 52–57, which serve to indicate when a particular switch has been depressed. Additionally, an ON/OFF switch 60 is mounted on the control panel 40 to control energization of the various components of the air conditioning unit 20.

Mounted directly on the return bend of the evaporator coil 24 by means of a metal strap 61 or other suitable means is an evaporator temperature sensor 62, which may also be a thermistor and which monitors the temperature of the evaporator coils.

Referring again to FIG. 1, there is illustrated in block diagram form the various electrical components which operate the air conditioning unit 20. A memory 64 and a compressor and fan timer 65 operate in conjunction with control logic 66. Other inputs to the control logic 66 include the ambient temperature sensor 51, the evaporator temperature sensor 62, the control panel 40 and the thermostat slide switch 50. Outputs from the control logic 66 include two compressor triacs 73 and 74, three fan triacs 70, 71 and 72, and the LED's 52–57.

Figure 5:
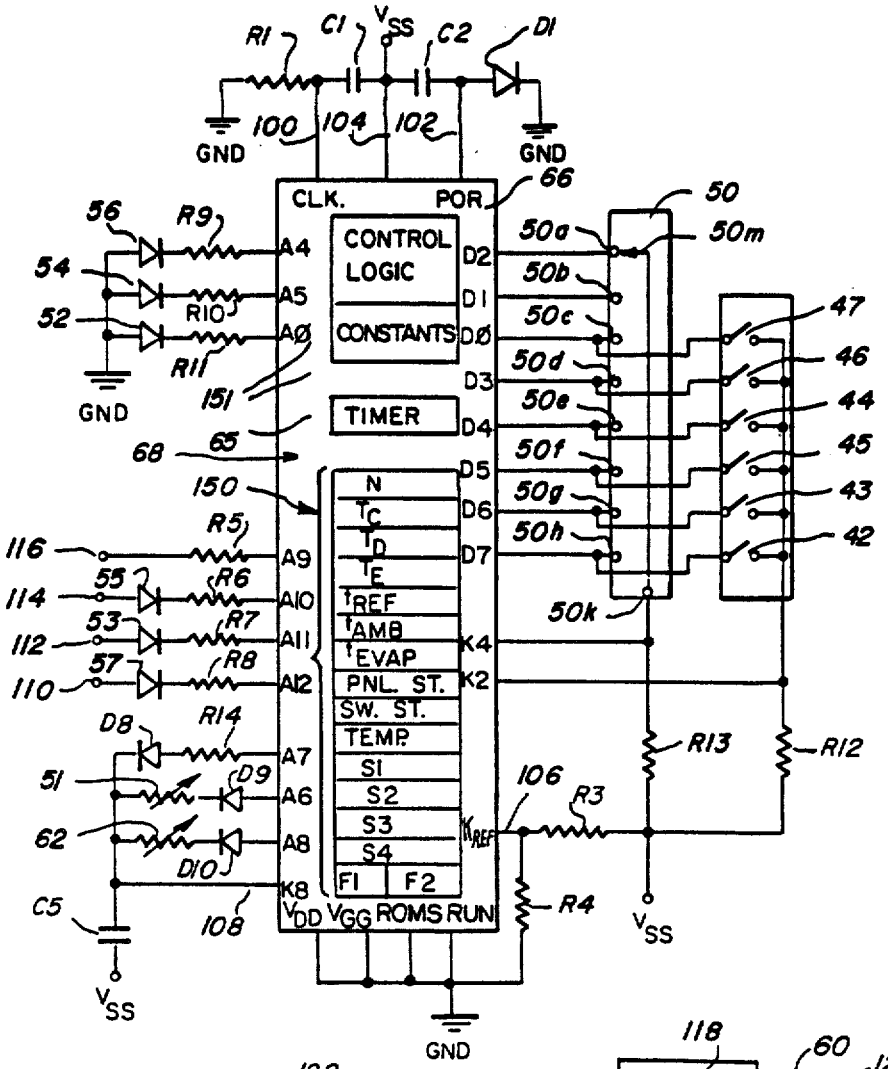
FIG. 5 is a schematic diagram of the control logic shown in block form in FIG. 1.

Referring also to FIG. 5, the memory 64, the timer 65 and the control logic 66 shown in FIG. 1 may be implemented using digital logic or through the use of a microcomputer as shown in FIG. 5. In the preferred embodiment, shown in detail in FIG. 5, a single chip microcomputer 68 is used to implement the circuitry shown within dashed lines in FIG. 1. In the illustrated embodiment, microcomputer 68 is implemented by using an American Microsystems, Inc. S2000 Microcomputer which has a 1024 word by 8-bit Read-Only-Memory (ROM) 151, a 64 word by 4-bit Random-Access-Memory (RAM) 150 substantially corresponding to the memory 64 of FIG. 1, a switch interface and a seconds timer (not shown) for the 60 Hz. power line which powers the air conditioner and associated drivers. The control logic 66 is implemented in the ROM 151, which also contains the control program and contants for the system. Various intermediate and final values are stored in registers in the RAM 150. Although, for purposes of clarity the intermediate and final values are illustrated as being stored in separate and distinct registers in the RAM 150, it is to be understood that a single register may hold more than one value over the course of a program execution.

Referring to FIGS. 1, 2 and 3, the operation of the air conditioning control will be described in general terms with particularizations to be made in subsequent parts of this specification.

Once the air conditioning unit 20 has been energized by depressing the ON/OFF switch 60, the user can select a variety of control functions by depressing one or more of the switches 42–47 located on the control panel 40. If the user depresses the "FAN ONLY" button 44 in conjunction with the high speed (or "HI") button 43, or the medium speed ("MED") button 45 or the low speed ("LOW") button 47, the fan 26 is energized at the particular speed selected while the compressor 32 remains off. Constant fan speed with cooling can be accomplished by depressing any one of the "HI" 43, "MED" 45 or "LOW" 47 buttons. Use of one of the three buttons and no other button being depressed results in the fan 26 being set to a selected speed while the compressor 32 is energized.

Figure 4A:
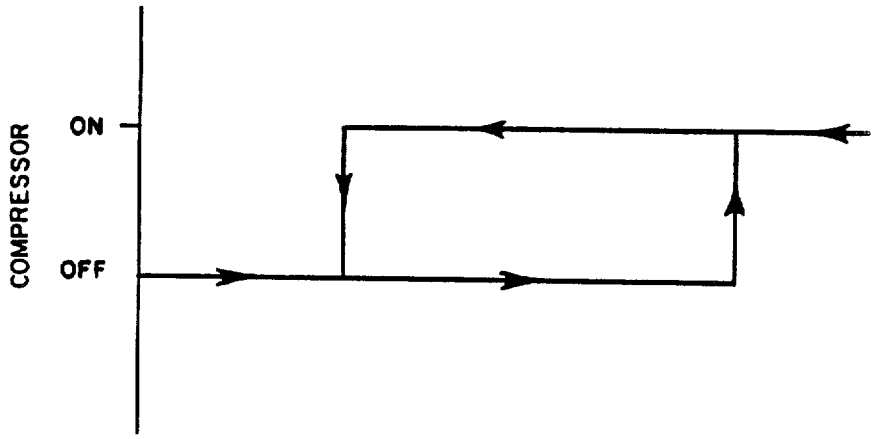
FIGS. 4a and 4b are diagrams of the transfer function of the AUTO mode of the present invention.
Figure 4B:
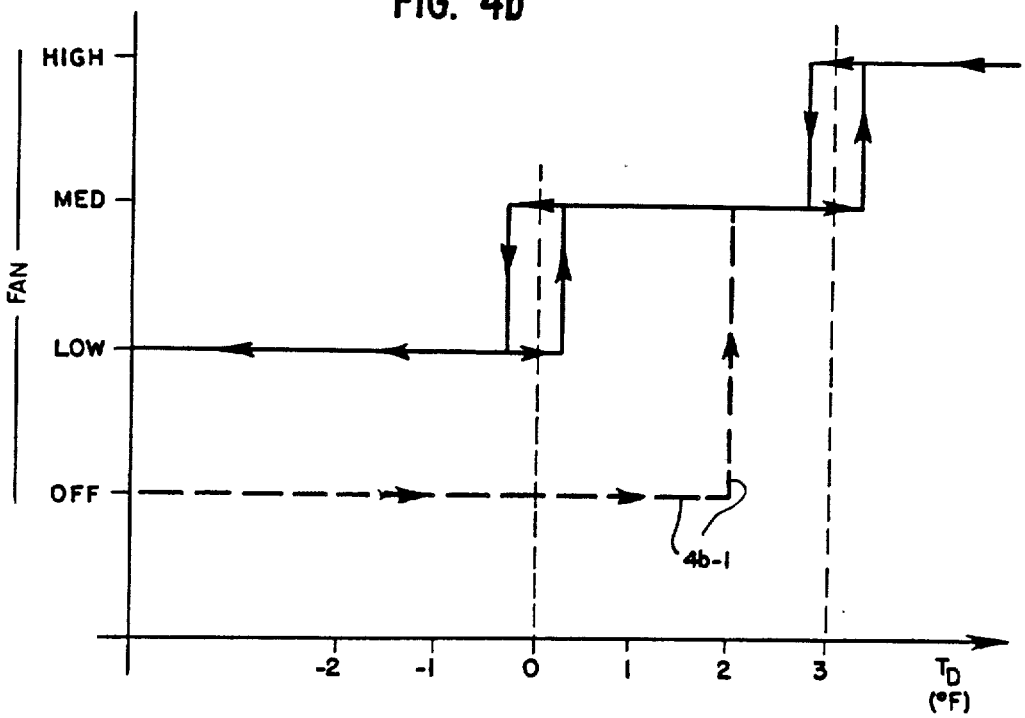

Referring also to FIGS. 4a and 4b, the transfer functions for the compressor 32 and fan 26 when the "AUTO" button 42 alone is depressed are illustrated. The compressor 32 is energized if the difference between the ambient temperature and the set point temperature, or $T_D$, is greater than +2° F. If $T_D$ is less than −2° F., the compressor is turned off. If $T_D$ is greater than −2° F. but less than +2° F., the compressor is either on or off depending upon whether the compressor was on or off before entering the interval between −2° F. and +2° F. In general, if the compressor was off before entering the interval, it will remain off until $T_D$ equals +2° F. and if on before entering the interval, will remain on until $T_D$ equals −2° F.

In the "AUTO" mode the fan speed also varies as a function of the variable $T_D$. In general, the fan is set to high speed when $T_D$ is greater than approximately 3+ F. and is set to low speed when $T_D$ is less than approximately 0° F. In the range from 0° F. to 3° F. the fan speed is set to medium. The microcomputer 68 provides a slight amount of hysteresis (approximately 0.5° F. centered at the switching points) to obtain noise immunity; therefore the fan switches speeds approximately 0.25° F. on either side of the switching points.

Use of the "AUTO" button 42 along with the "FAN ONLY" button 44 results in the compressor 32 being turned off while the fan 26 alone continues to cycle in the "AUTO" mode; i.e. the fan speed will vary according to the variable $T_D$.

Use of the "POWER SAVER" button 46 in conjunction with the "AUTO" button 42 results in compressor 32 following the AUTO transfer function while the evaporator fan 26 remains energized at low speed for two minutes by the timer 65 after the compressor 32 cycles off. This feature is used to take advantage of the extra cooling capacity which remains in the evaporator 24 after the compressor 32 cycles off. Furthermore, as shown by the dotted line 4b-1 of FIG. 4b, the "POWER SAVER" mode prevents the fan from turning back on until $T_D$ has reached +2° F., at which point the fan speed is set to medium.

Selection of one of the buttons 42–47 will light its corresponding LED visual indicator; e.g. selection of button 42 will light LED 52. This provides a ready indication of the status of the air conditioning unit 20 at any time. The buttons 42–47 are of suitable construction and in the preferred embodiment are small excursion pressure sensitive contact switches which have little or no tactile feedback.

The compressor is prevented by the timer 65 from startup until after approximately two minutes has elapsed from the time the compressor 32 cycles off. This is used to prevent short cycling and to prevent lockup of the compressor 32. Microcomputer 68 also monitors the evaporator temperature sensor 62 and shuts off the compressor 32 in the event that the evaporator temperature falls below a predetermined limit. This feature is included to prevent significant frost buildup on the evaporator 24.

Figure 6:
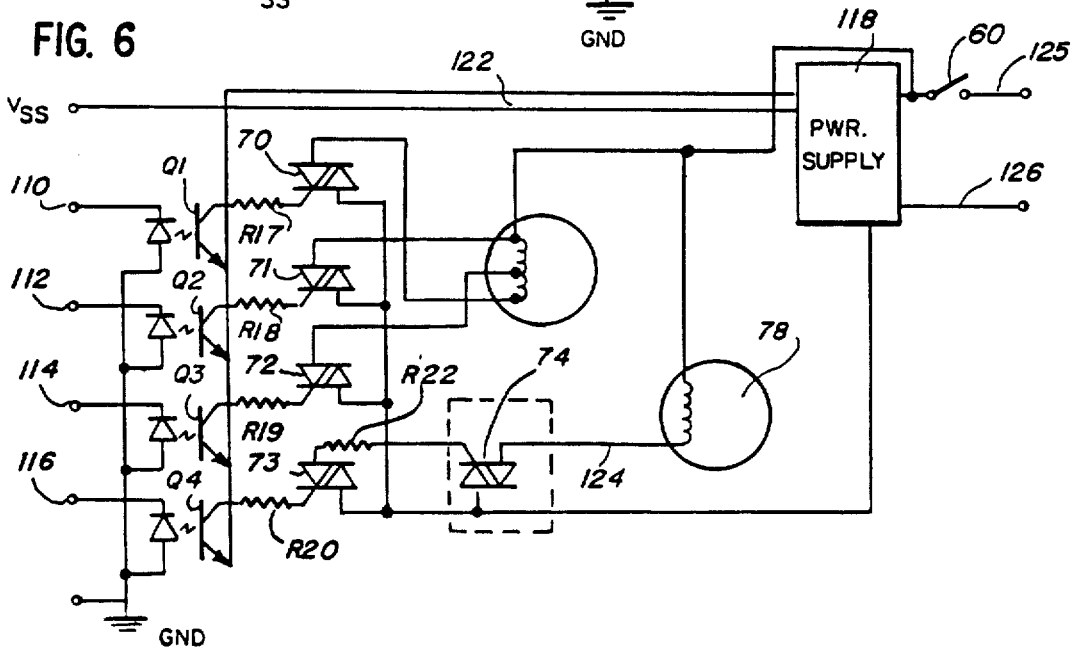
FIG. 6 is a schematic diagram of the compressor and fan triac circuits shown in block form in FIG. 1.
Figure 8D:
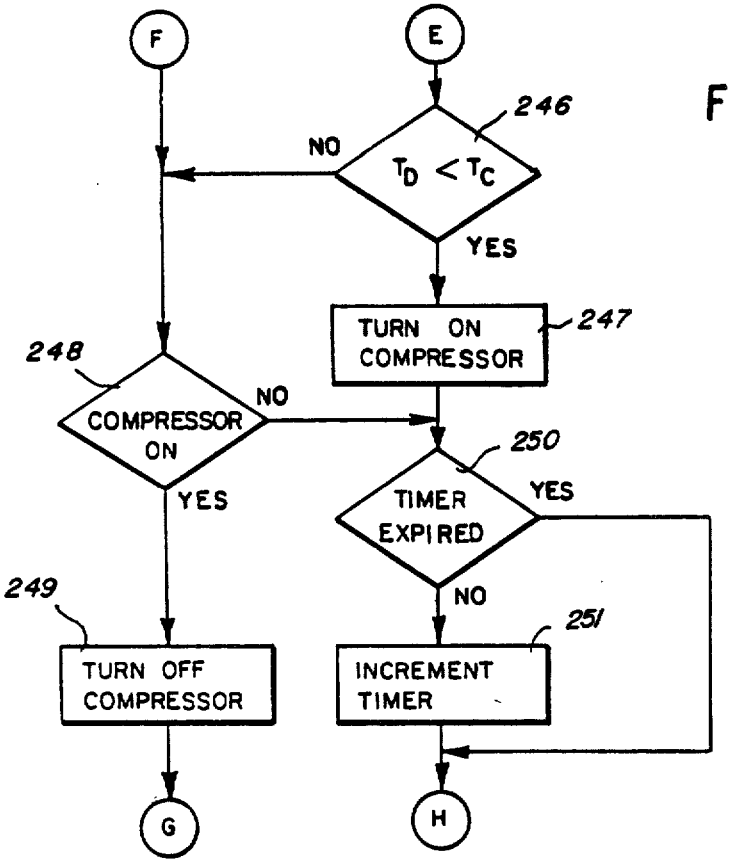
FIGS. 8a, 8b, 8c and 8d comprise a single flowchart, when joined along similarly lettered lines, of the control program contained in the control logic.

In FIGS. 5 and 6, the circuit of the temperature control system, shown in block form in FIG. 1, is illustrated in detail. Resistor R1 and capacitor C1, FIG. 5, connected in series between a voltage supply source $V_{SS}$ and a source of ground potential GND, form a timing circuit for a signal from an internal clock oscillator of the microcomputer 68. This clock signal, derived at the junction of R1 and C1, is inputted on line 100 to the clock or CLK input of the microcomputer 68. A capacitor C2 and a diode D1 connected in series between $V_{SS}$ and ground potential GND provide a power-on-reset function with the capacitor C2 holding the computer reset line low momentarily to allow time for the power supply to stabilize. The diode D1 pulls the reset line low in case of a power failure, restoring the microcomputer to its initial state. The power-on-reset signal is transmitted over a line 102 to the power-on-reset (POR) input to the microcomputer 68. The voltage supply $V_{SS}$ is inputted to the microcomputer 68 over line 104.

Display output lines A0, A4, A5, A10, A11 and A12 sink current through LED's 52–57 when the corresponding line is pulled low. Resistors R6–R11 connected in series between the LED's 52–57 and their corresponding "A" lines limit the current through the LED's. In addition, the output lines A10, A11 and A12 also turn on the fan triacs 70, 71 and 72 illustrated in FIG. 6. The output line A9 drives the compressor 32 through a resistor R5 in a manner to be hereinafter described.

In the illustrated embodiment, the slide switch 50 consists of eight contacts 50a–50h each individually connected to an associated, different D line, and an output contact 50k connected to a movable wiper 50m which is manually moved by the user into contact with one of the inputs 50a–50h.

The touch panel switches 42–47 and the thermostat slide switch 50 positions are scanned by eight sensing outputs D0–D7 and two switch data inputs K2 and K4. Sequentially, each "D" line is sent a signal by the control logic 66, while the other "D" lines are de-energized. The two switch data inputs, K2 and K4 are inputted while each "D" line is pulled high. If K2 detects a signal, this indicates that the touch panel switch 42–47 corresponding to the enerigzed "D" line is depressed. Similarly, input K4 connected to the output 50k of slide switch 50, determines the slide switch position and the control logic 66 internally converts the slide switch position into a value proportional to the desired temperature set point. The slide switch position is then stored by the control logic 66 in a switch state register (denoted SW.ST.) in the RAM 150, and the contents of the register are used to access a memory location in the ROM 151 which contains the corresponding set point value. This set point value is written over the contents of the SW.ST. register for use in later calculation.

Resistors R12 and R13, connected between the supply voltage $V_{SS}$ and respectively control panel 40 and slide switch 50, pull the K2 and K4 input voltages down so that they will appear low when a button or switch is open. The touch panel is "debounced" by the control logic 66; a touch panel switch must be pushed for four consecutive microcomputer cycles (approximately 250 milliseconds) or it will be ignored. Resistors R3 and R4 connected between voltage supply $V_{SS}$ and GND provide a reference voltage at their junction which is inputted to the $K_{REF}$ input to the microcomputer 68 over a line 106. This reference voltage provides a basis for determining the state of input signals to K2 and K4 input terminals. Two voltage supply inputs $V_{DD}$ and $V_{GG}$, a ROM source control "ROMS" and a Run/Wait control "RUN" are all connected to ground potential GND.

Temperature information is inputted to the microcomputer 68 at an input K8 over a line 108. The diodes D8, D9 and D10 are connected to the output lines A7, A6 and A8 in series with a reference resistor R14, the ambient temperature sensor 51 and the evaporator temperature sensor 62, respectively. The three lines are connected to voltage supply $V_{SS}$ through the capacitor C5 and to the input line K8 through the line 108.

Figure 7:
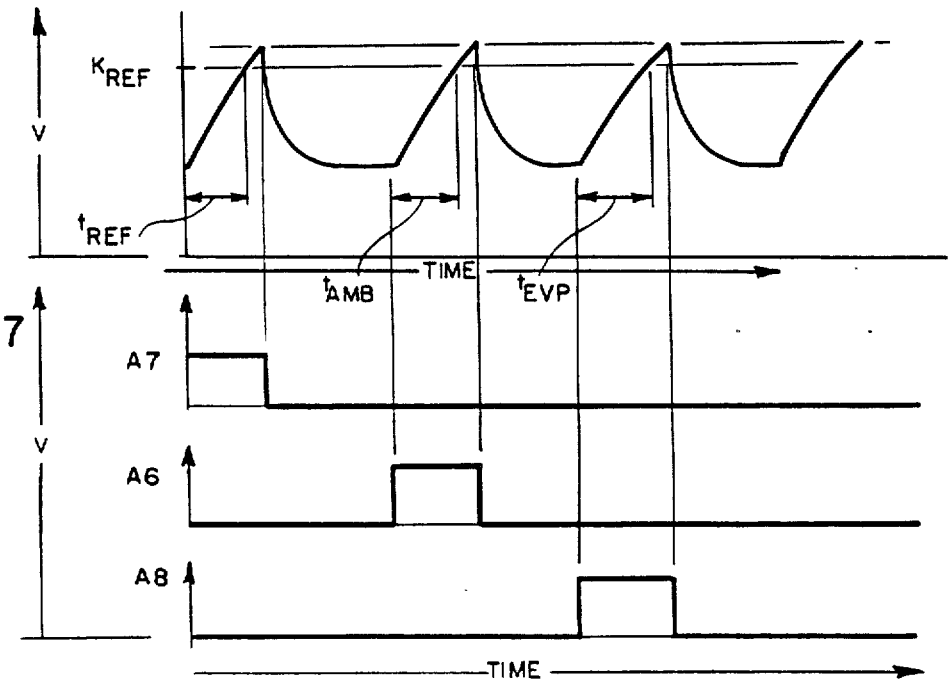
FIG. 7 illustrates waveform diagrams (not to scale) of the sensor resistance value detection process.

Referring to FIG. 5 and the timing diagram of FIG. 7, the timing capacitor C5 is first discharged by the input K8 with the output lines A6, A7 and A8 de-energized to eliminate any residual charge present on C5. Then the output line A7 comprising a first charging means is energized, charging the capacitor C5 through the reference resistor R14 which is of a known value. The diodes D9 and D10 prevent current flow through the other two resistors, sensors 51 and 62. The time before the input K8 reaches a particular voltage is measured by timing means in the form of the control logic 66 in terms of microcomputer timing cycles (this voltage is equal to the voltage appearing at the $K_{REF}$input, or about 3 volts). This time, $t_{REF}$, denoted the reference charge time and as shown in FIG. 7, is proportional to the resistance of R14 and is stored in a register in the RAM 150. The capacitor C5 is then discharged by the input K8 and in a similar manner output line A6 is energized and the time before the input K8 reaches the particular voltage is measured to obtain an ambient thermistor charge time, $t_{AMR}$. The process is repeated by the output line A8 to measure the evaporator thermistor charge time, $t_{EVAP}$. The output lines A6–A8 together comprise sequential charging means in that the capacitor C5 is first charged through the reference resistor R14, and is then charged through the ambient thermistor or evaporator thermistor. The control logic 66 then computes the quotients $(t_{REF}-t_{AMB})$ divided by $(t_{REF}+t_{AMB})$ and $(t_{REF}-t_{EVAP})$ divided by $(t_{REF}+t_{EVAP})$. These quotients are proportional to the ambient and evaporator temperatures respectively. The division process cancels any errors due to capacitor leakage and line saturation voltage because all charge times are affected in a similar manner and hence any error present disappears in the division process. Both the ambient and evaporator temperatures are updated several times per second.

Referring now to FIG. 6, the power supply is shown in block form and triac circuits are illustrated in detail. The inputs to the triac circuits are lines 110, 112, 114 and 116, which are output lines from the microcomputer 68, see FIG. 5, and which control the fan triacs 70, 71 and 72, and the triacs 73 and 74 for the compressor 32. Optical couplers Q1, Q2, Q3, and Q4 isolate the microcomputer 68 from the trigger circuitry for the fan 26 and the compressor 32. If any of the "A" output lines A9, A10, A11 or A12 are in a low state, then the signal over the corresponding line 110, 112, 114 or 116 will also be low, thereby allowing current to pass through and lighting the LED portion of optical couplers Q1–Q4. If one of these LED's is energized, the corresponding optical couplers Q1–Q4 will gate into conduction one of the triacs 70, 71, 72 or 73 through corresponding resistors R17–R20, thereby allowing current to pass through the corresponding triac. The triacs 70, 71 and 72 are each connected to different motor winding taps of a fan motor 76 connected in a conventional manner (not illustrated) so that energization of one of these triacs will cause the fan 26 to operate at a particular speed. The triac 73 is connected to another triac 74 which in turn is connected to a winding of compressor motor 78. In the case of triac 70, 71 or 72, the fan will be activated in either a low, high or medium speed mode respectively. In the case of triac 73 the slave triac 74 will be gated by a signal through resistor R22 to energize the compressor motor winding 78 over line 124.

Regulated power supply 118 connected to a source of electrical power through lines 125 and 126 provides a source of constant DC voltage, $V_{SS}$ over line 122 to the various components of the control. In the illustrated embodiment, $V_{SS}$ is set to −9.0 volts. The ON/OFF switch 60 is interposed between line 125 and power supply 118 to control energization of the various components of the system.

Referring now to FIGS. 8a–8d, a flow chart of the control program stored in the ROM 151 of microcomputer 68 is illustrated. System startup is initiated at block 200 by depressing the ON/OFF switch 60. The compressor 32 and the fan 26 are then turned off by block 201. The switch state is set by block 202 to "AUTO" and the "POWER SAVER" is turned on, i.e. the fan speed will vary according to the difference between the ambient temperature and the set point temperature and the fan 26 will remain on for two minutes after the compressor cycles off. These conditions are set by block 202 so that the various components of the air conditioner are operating in a specific manner until the actual panel state is determined. These conditions are stored in a panel state register (denoted PNL.ST.) of RAM 150 (see FIG. 5) and will continue to exist until updated by the microcomputer 68.

The compressor threshold temperature $T_C$, which is the temperature at which the compressor cycles on, is set by block 203 at 2° F. above the set point temperature selected by the position of the slide switch 50. A block 204 now clears the two minute compressor timer 75 to begin another two minute interval before which the compressor cannot be actuated.

In order to scan the slide switch 50 and the panel buttons 42–47 to determine which slide switch position 50a–50h and which button 42–47 has been selected, the control logic utilizes a scanning process. At block 205 the 8-bit binary representation of the number 1 is assigned to a variable N which is stored in the RAM 150 and which represents the particular "D" line being scanned at any particular moment. Each "D" line is assigned a particular bit of an 8-bit binary number such that when a "1" is present in a particular bit, that "D" line is scanned at that time. Line D0 is assigned the lowest order bit (i.e. the value 00000001), line D1 is assigned the value 00000010 and so on, until D7, which is assigned the value 10000000. In this manner a line scanning control is implemented by doubling the value of the variable N, thereby placing a signal in the next highest order bit of the variable N and consequently scanning the next "D" line in the series.

Decision block 206 determines if the particular touch panel switch corresponding to the binary value of the variable N at that particular instant has been pushed. If a signal is detected on input K2, indicating a yes, control passes to a block 207 to determine whether the touch panel switch has been closed for four cycles, or approximately 250 milliseconds. If this is the case, block 208 stores the new panel state in the PNL.ST. register in the RAM 150. Block 209 energizes the LED corresponding to the particular button which has been pushed.

If block 206 determines that the particular touch panel switch has not been depressed or if block 207 determines that the button has not been pushed for four cycles, control shifts to block 210 which determines whether the slide switch 50 is in the particular position N. If the slide switch 50 is in the particular position corresponding to the binary value of the variable N, then block 211 utilizes the switch state position to access a portion of memory in the ROM 151. The value stored in this position of memory is the set point temperature value corresponding to the switch state position selected by the user. Block 211 retrieves this value and stores it in the SW.ST. register in the RAM 150 for later use. If the switch is not in the position N, control shifts to block 212 in which the variable N is updated by multiplying its binary representation by two, thereby placing a signal on the next "D" line in the series.

Figure 8A:
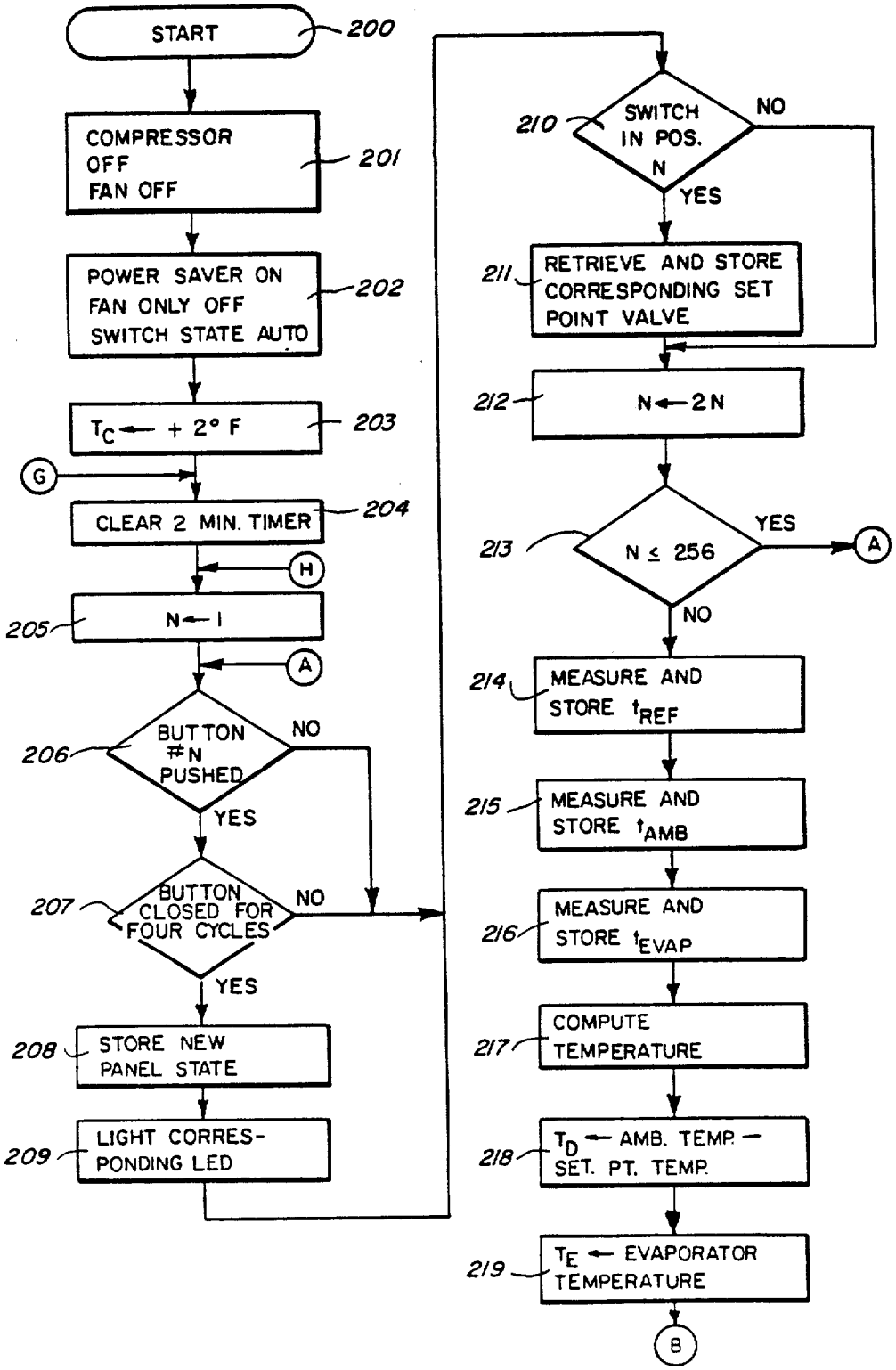
Figure 8B:
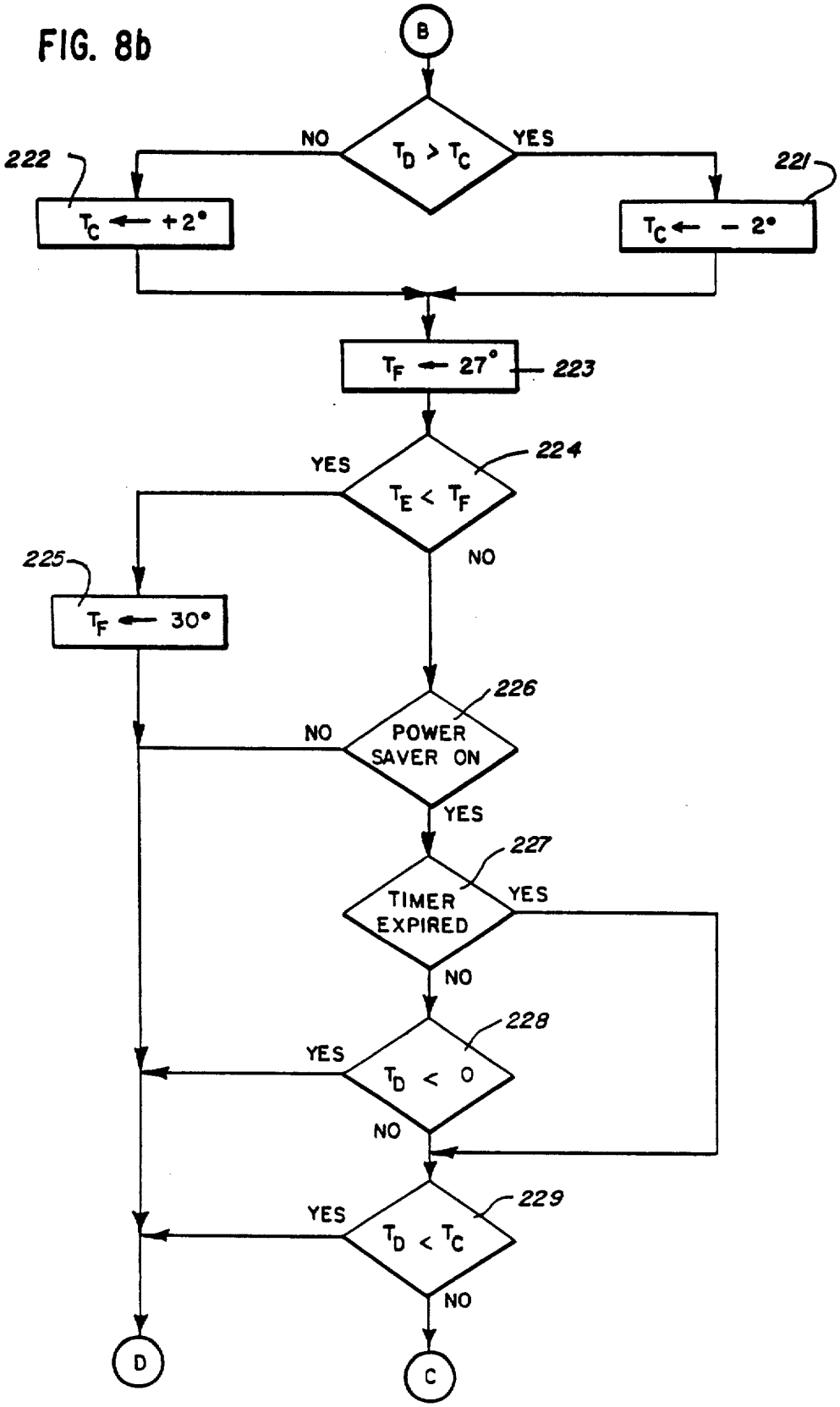
Figure 8C:
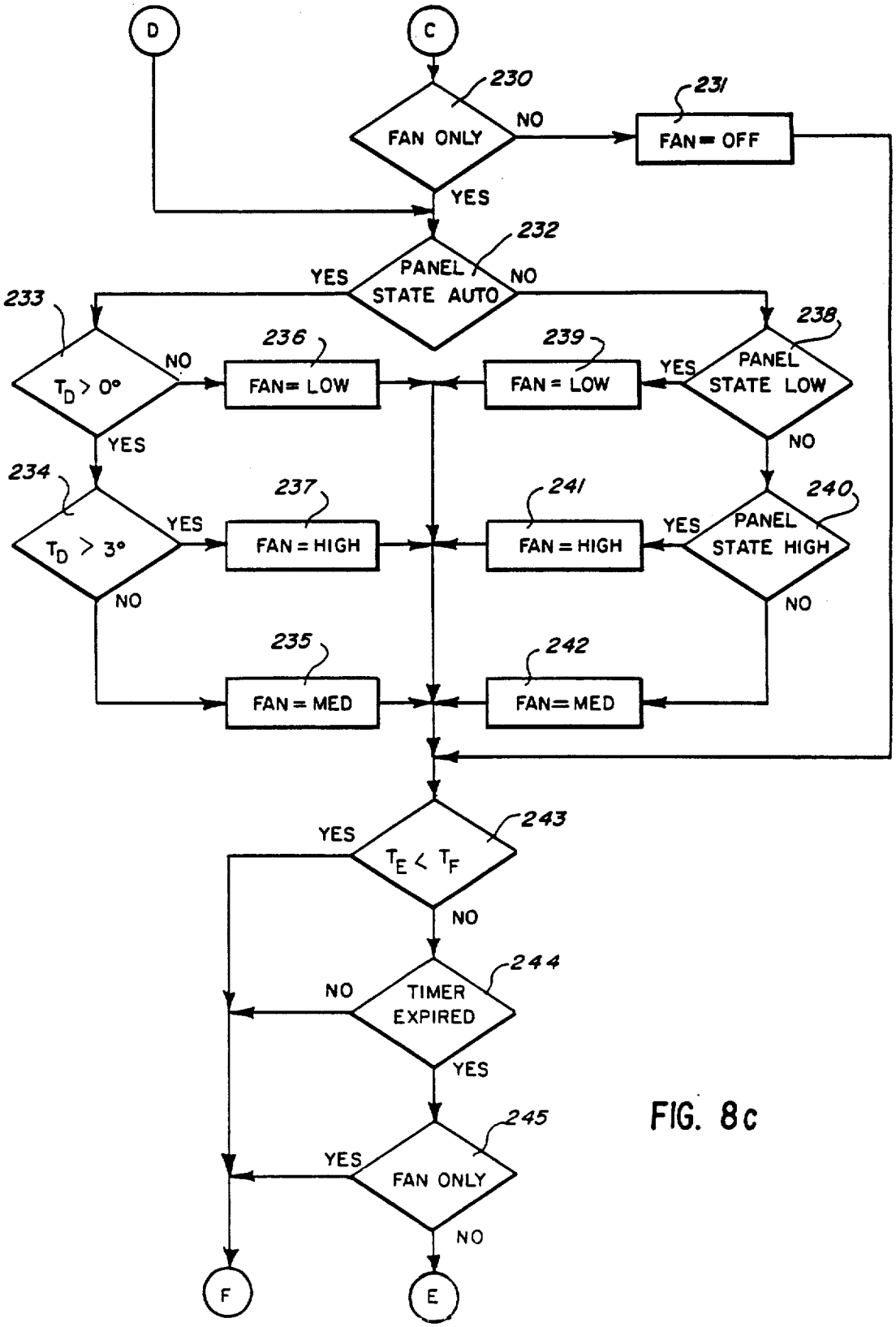

A block 213, FIG. 8a, determines whether the variable N is less than or equal to the binary representation of 256, which in binary representation is 10000000; i.e. the block 213 determines whether "D" lines D0–D7 have all been scanned. If the variable N is less than or equal to 256, control shifts back to block 206 to continue the scanning sequence.

If N is greater than 256, indicating that all "D" lines have been scanned, control passes to timing means, block 214, which times and stores the value for the reference resistance charge time $t_{REF}$ in its register located in the RAM 150. Blocks 215 and 216 also comprise timing means and measure and store the temperature thermistor and evaporator thermistor charge times, $t_{AMB}$ and $t_{EVAP}$ in their respective registers in the RAM 150.

Block 217 performs a computation wherein the ambient and evaporator thermistor charge times are converted to temperature values by means of a linearization approximation program described later with reference to FIGS. 9a and 9b.

Block 218 recalls the contents of the SW.ST. register and computes the difference between the ambient temperature value and the set point temperature value, as set by slide switch 50, and stores this value in the $T_D$ register in the RAM 150 (see FIG. 5). Similarly block 219 stores the evaporator sensor temperature in the $T_E$ register in the RAM 150.

Block 220 determines whether $T_D$, which represents the difference between the ambient temperature and the set point temperature, is greater than the threshold compressor value, or $T_C$. If this is true then block 221 stores a value of −2° F. in the register $T_C$ in the RAM 150. If $T_D$ is not greater than $T_C$, then block 222 stores a value of +2° F. in the register $T_C$.

A block 223 stores a value of 27° F. in a register $T_F$ located in the RAM 150, which represents the point at which an unacceptable amount of frost has built up on the coils of the evaporator 24. Block 224 determines whether the evaporator temperature is less than the value stored as the variable $T_F$. If this is not the case, block 226 then recalls the contents of the PNL.ST. register and determines whether the "POWER SAVER" mode is selected, and if it is, block 227 decides whether the two minute fan period has expired. If the two minute fan period has not expired, block 228 determines whether the variable $T_D$ is less than 0° F., indicating that the ambient temperature is less than the set point temperature. If this is not the case, then block 229 determines whether the variable $T_D$ is less than $T_C$, which represents the compressor threshold temperature, which was set by either block 221 or 222. If block 227 determines that the two minute period for the evaporator fan 26 is expired, then block 228 is skipped and control passes directly to block 229.

When $T_D$ is not less than $T_C$, control passes to block 230 which determines whether the "FAN ONLY" button 44 has been pushed. If this is the case then block 232 determines whether the "AUTO" button 42 has been pushed by the user.

If block 224 determines that the temperature of the evaporator coils is less than the value of the variable $T_F$, then block 225 stores a value of 30° F. in the RAM 150 as the value of variable $T_F$. From block 225 control passes directly to block 232 which determines if the "AUTO" button 42 has been pushed. Similarly, if the "POWER SAVER" is not on, or if $T_D$ is less than 0, or if $T_D$ is less than $T_C$, control passes to block 232.

If block 232 determines that the "AUTO" function has been selected by the user, a search is performed for the interval within which the value of the variable $T_D$ falls. Block 233 determines if the variable $T_D$ is greater than 0° F. If it is, then block 234 determines whether the variable $T_D$ is greater than 3°. If it is found that $T_D$ is not greater than 3°, indicating that the difference between the ambient temperature and the set point temperature lies in an interval between 0° and 3°, block 235 energizes the line 114 of FIG. 6, thereby setting the fan speed to medium. If, however block 233 determines that $T_D$ is not greater than 0°, indicating that the ambient temperature is less than the set point temperature, block 236 energizes the line 110 of FIG. 6 to set the fan speed to low. If in the event that block 234 determines that $T_D$ is greater than 3°, indicating that the difference between the ambient temperature and the set point temperature is greater than 3°, block 237 energizes the line 112 to set the fan 26 to high speed.

If block 232 determines that the user has not selected the "AUTO" mode, then block 238 determines whether the user has selected the "LOW" speed fan function. If this is the case then block 239 sets the fan speed to low by energizing the line 110. If it is determined by block 238 that the user has not selected the "LOW" fan speed function then block 240 determines whether the "HI" speed fan function has been selected. If this is the case then block 241 sets the fan speed to high by energizing the line 112. If block 240 determines that the "HI" speed function has not been selected, then control passes to block 242, which energizes the line 114 and thereby sets the fan speed to medium. Regardless of which fan speed has been selected, control passes to block 243 which again determines whether the temperature is less than the value stored as the variable $T_F$ in the RAM 150.

If block 230 determines that the "FAN ONLY" mode is not selected then block 231 de-energizes the lines 110, 112 and 114 to turn the fan 26 off and control passes directly to block 243.

If it is found in block 243 that the evaporator temperature is not less than the variable $T_F$, block 244 determines whether the two minute compressor lockout period has expired. If it has, then block 245 determines whether the "FAN ONLY" mode has been selected.

If block 245 determines that the "FAN ONLY" mode has not been selected, then block 246 determines whether the value of the variable $T_D$ is less than the value of the variable $T_C$. If this is true, indicating that the difference between the ambient temperature and the set point temperature is less than the compressor threshold temperature, then block 247 turns the compressor on by energizing the line 116 in FIG. 6.

If block 243 determines that the evaporator temperature is less than the variable $T_F$, indicating that an excessive amount of frost is forming on the evaporator 24, control shifts to block 248 which determines whether the compressor 32 is on. Likewise, control shifts to block 248 from block 244 if the two minute compressor lockout period has not expired, or if it is deterined by block 245 that the "FAN ONLY" mode is selected, or if block 246 determines that the variable $T_D$ is not less than the variable $T_C$. If block 248 determines that the compressor 32 is on, then block 249 turns the compressor 32 off by de-energizing the line 116 because a mode is selected in which the compressor 32 is not used. From block 249 control shifts back to block 204 to begin another control program execution.

If block 249 determines that the compressor 32 is not on, then block 250 again decides whether the compressor lockout period is expired. If it is not, block 251 advances the timer by one clock interval and control then shifts to block 205 where another program execution is run. If block 250 determines that the lockout period has expired, control passes directly to block 205.

Figure 9A:
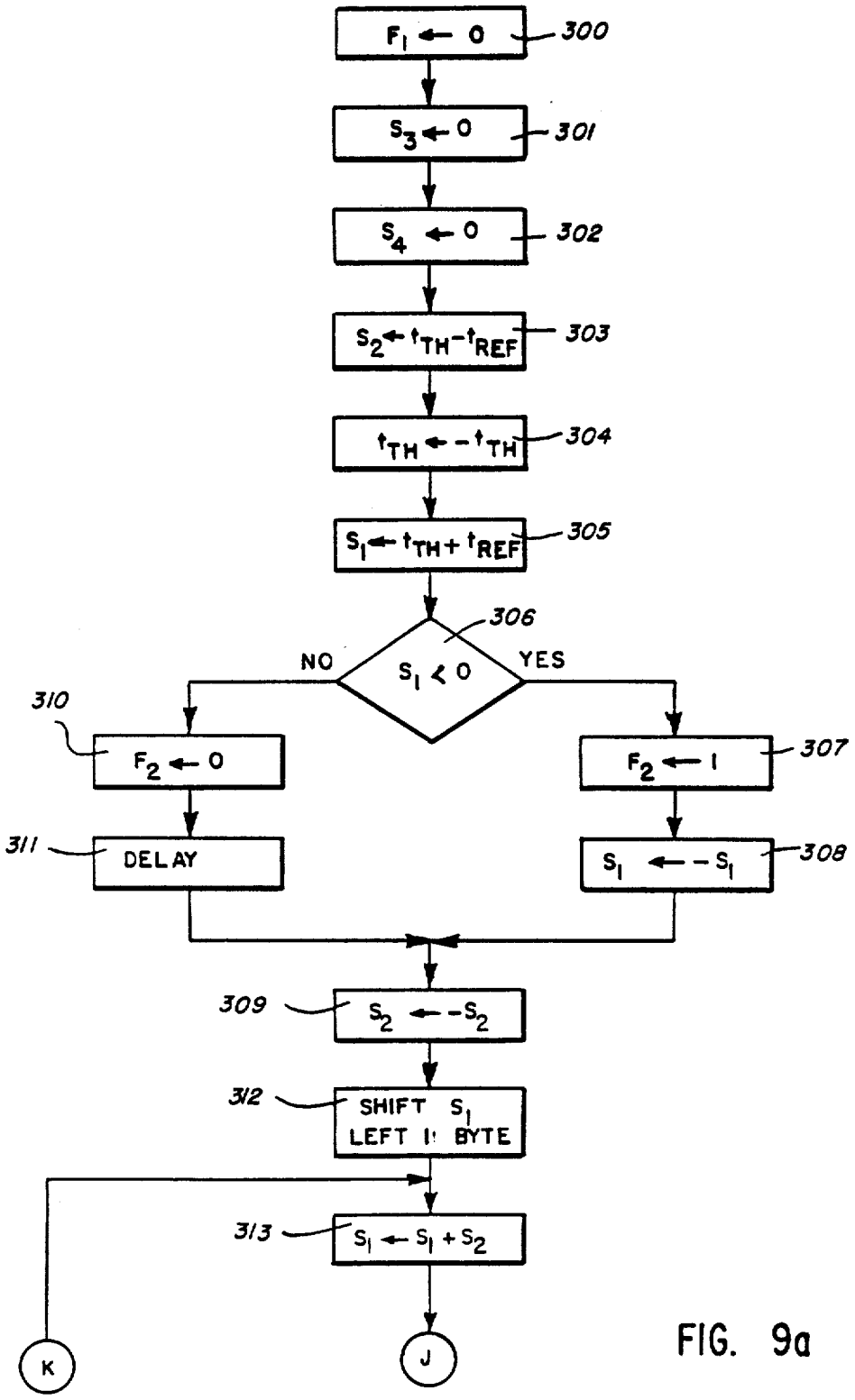
FIGS. 9a and 9b comprise a single flowchart, when joined along similarly lettered lines, of the temperature determining program contained in the control logic.
Figure 9B:
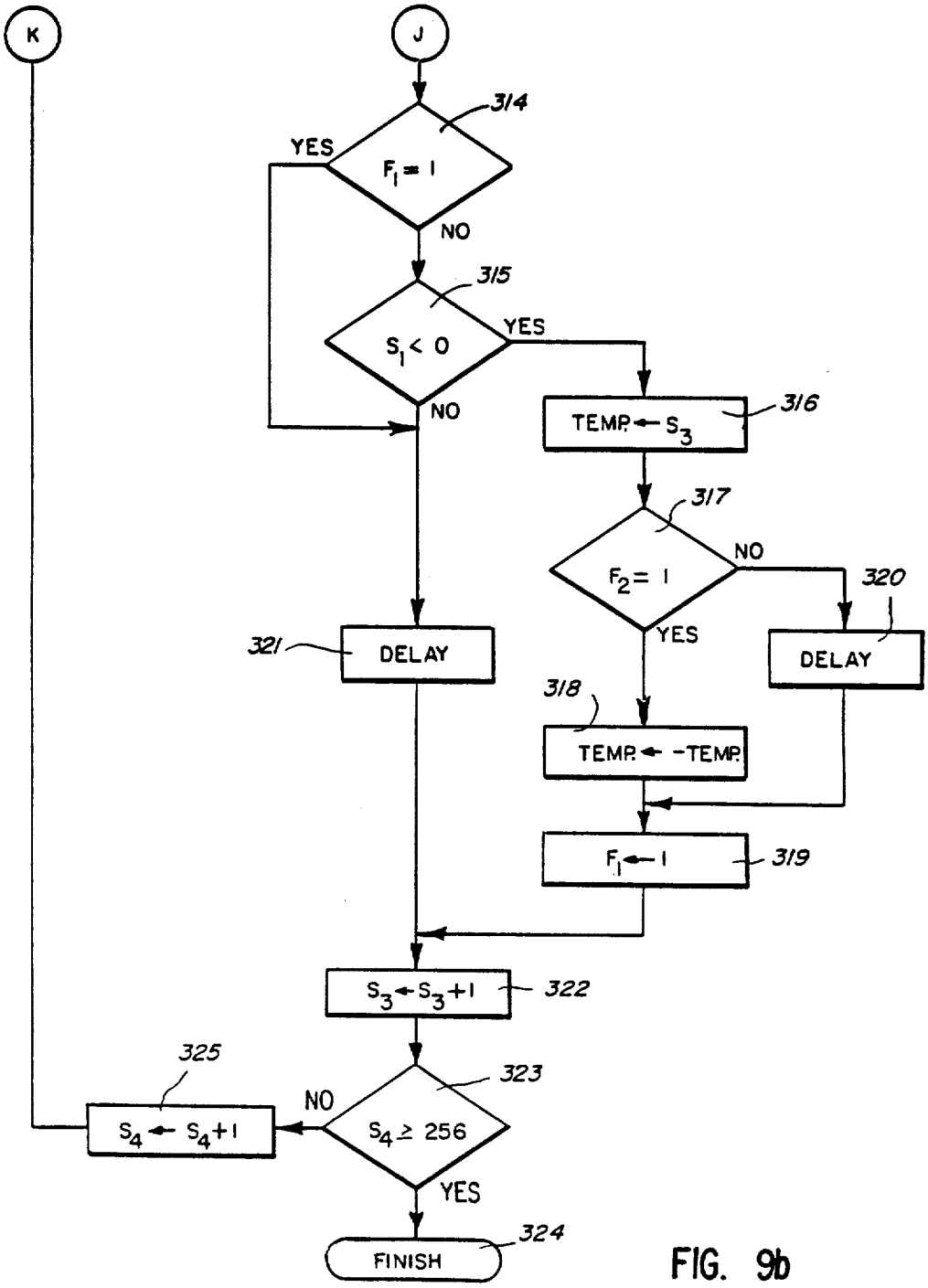

Referring now to FIGS. 9a and 9b, the thermistor linearization program as performed by block 217 of FIG. 8a is illustrated in detail. It is generally known by those skilled in the art that a thermistor's resistance varies in a logarithmic manner with the temperature the thermistor is exposed to. The program makes a first order approximation of this logarithmic thermistor transfer function, and is virtually error free for a narrow range (approximately 20°). The program is implemented in the control logic 66 using double precision (8-bit) two's complementing arithmetic. No multplication or division is directly required. The program determines both the ambient and evaporator temperatures using the same steps. The approximation is analogous electrically to putting a thermistor in a bridge circuit and using conventional circuit analysis techniques to determine its resistance. In addition, the execution time is made constant by the use of timing delays inserted in various portions of the program.

The approximation is made by computing two temporary sums (using the ambient sensor as an example): S1, which is equal to $(t_{REF}-t_{AMB})$; and S2, which equals $(t_{REF}+t_{AMB})$. S1 is multiplied by the binary equivalent of 256 (or 10000000) and S2 is subtracted from it until the result becomes negative. The number of total subtractions, stored in the RAM 150 as a temporary variable S3, is the end result and is also stored in the RAM 150 as the variable TEMP.

The approximation routine begins at block 300, where a temporary flag F1, which indicates when a result is computed, is set to zero and is stored in the RAM 150. Block 301 assigns a value of 0 to the temporary 8-bit number stored in the register S3. Similarly, block 302 assigns a value of 0 to another temporary 8-bit number stored in a register S4. Block 303 adds the reference resistance charge time $t_{REF}$ and the thermistor resistance charge time $t_{TH}$ (either $t_{AMB}$ or $t_{EVAP}$) and assigns this value to the temporary 8-bit variable stored in a register S2.

Block 304 inverts the sign of the thermistor resistance charge time and a block 305 adds the inverted thermistor resistance charge time and the reference resistance charge time and stores the result in a register S1.

A decision is then made by block 306 whether the temporary number S1 is less than 0. If it is, block 307 assigns the number 1 to another 1-bit flag denoted F2 which indicates that S1 is negative. Then, block 308 inverts the sign of the temporary number S1 to a positive sign. Block 309 then performs the same sign inversion upon temporary number S2.

If block 306 determines that S1 is not less than 0, then block 310 assigns a value of 0 to the temporary 1-bit flag F2, indicating that S1 is positive. A delay is provided by block 311 so that the time required to go through the branch of the loop consisting of block 310 and block 311 is the same as the time required to go through the portion of the loop consisting of blocks 307 and 308. Control from block 311 then shifts to block 309.

Block 312 shifts the S1 register left one byte, leaving zeroes in the 8-bits of the lower order byte. This is equivalent to multiplying S1 by 256. Block 313 adds temporary numbers S1 and S2 and stores the result in the register S1. This, in effect, is equivalent to subtracting S2 from S1.

Block 314 determines whether the temporary 1-bit flag F1, used to indicate that the result has been found, is equal to 1. If it is not, indicating that the approximation is not complete, then block 315 determines whether the temporary 8-bit number S1 is less than 0. If S1 is less than 0, indicating that the last subtraction of S2 from S1 has yielded a negative result, then block 316 stores the value of S3 (i.e. the total number of subtractions) in the TEMP register in the RAM 150, which represents the thermistor temperature.

Block 317 determines whether the temporary flag F2 is equal to 1. If it is, indicating that S1 was originally negative, then block 318 inverts the sign of the variable TEMP. At this point a value of 1 is assigned to the 1-bit result flag F1 by block 319.

If block 317 determines that F2 is not equal to 1, then control passes to a delay at block 320, the length of which is the same amount of time it takes to operate in block 318.

If block 314 determines that F1 is equal to 1 or if block 315 determines that S1 is not less than 0 then control shifts to block 321, another delay block, which corresponds to the time it takes to operate in blocks 316, 317, 318 or 320 and 319. The purpose of each of the delay blocks is to assure that the time of execusion is constant regardless of the path taken within the control program.

Following block 319 or block 321 is a double precision addition routine by block 332 in which the value of S3 is incremented by one. Note that the value of TEMP will not be changed once it is determined that a result has been found (i.e. F1 equals 1) because of the jump from block 314 to block 321.

Block 323 determines whether the temporary 8-bit number S4 is greater than or equal to the binary equivalent of 256. If S4 is greater than or equal to 256 then block 234 terminates the approximation. If block 323 determines that S4 is not greater than or equal to 256 then block 325 increments the value of S4 by one and control passes back to block 313 where the approximation program continues.

The final value of the temperature is stored in the RAM 150 as the variable TEMP, which, because of the byte shift performed by block 312, is multiplied by 256. However, the values stored in the ROM 151 as the set point temperature values are similarly multiplied by 256, hence, this common factor "drops out" in subsequent operations in the main program.

Once the ambient and evaporator temperatures are computed and stored, control shifts to block 218 of FIG. 8a, where the main program resumes.

I claim:

1. A method of determining the temperature to which a thermistor is exposed utilizing a capacitor, a reference resistor, means coupled to the capacitor and actuable to selectively charge the capacitor through either of the reference resistor and the thermistor, means actuable to discharge the capacitor and timing means coupled to the capacitor, comprising the steps:

(a) actuating the charging means to charge the capacitor through the reference resistor;

(b) operating the timing means to measure the length of time required to charge said capacitor to a predetermined level to obtain a reference charge time;

(c) actuating the discharging means to discharge the capacitor;

(d) actuating the charging means to charge said capacitor through said thermistor;

(e) operating the timing means to measure the length of time required to charge said capacitor to said predetermined level through said thermistor to obtain a temperature charge time; and (f) computing the difference between the reference charge time and the temperature charge time and dividing the difference by the sum of said reference charge time and said temperature charge time to determine the temperature to which said thermistor is exposed.

2. The method of claim 1 in which a second thermistor is exposed to a different temperature, the second thermistor being coupled to the charging means, the charging means being actuable to selectively charge the capacitor through the second thermistor comprising the further steps of actuating the charging means to charge said capacitor through said second thermistor, operating the timing means to measure said length of time required to charge the capacitor to the predetermined level to derive a second temperature charge time, and computing the difference between the reference charge time and the second charge time with the difference being divided by the sum of said reference charge time and said second charge time to determine said different temperature.

3. A method of determining the temperature to which a thermistor is exposed in a temperature control system for a space cooling device having an evaporator, an evaporator fan, a compressor, control means including a microcomputer, a capacitor and a reference resistor, the microcomputer including charging means selectively actuable to charge the capacitor through either of the reference resistor and the thermistor, discharging means actuable to discharge the capacitor and timing means coupled to the capacitor, comprising the steps:

(a) actuating the charging means to charge the capacitor through the reference resistor;

(b) operating the timing means to measure the length of time required to charge said capacitor to a predetermined level to obtain a reference charge time input for said microcomputer;

(c) actuating the discharging means to discharge the capacitor;

(d) actuating the charging means to charge said capacitor through said thermistor;

(e) operating the timing means to measure the length of time required to charge said capacitor to said predetermined level through said thermistor to obtain a temperature charge time input for said microcomputer; and (f) computing in said microcomputer the difference between the reference charge time and the temperature charge time and dividing the difference by the sum of said reference charge time and said temperature charge time to determine the temperature to which said thermistor is exposed.

4. An apparatus for determining the temperature to which a thermistor is exposed, comprising:

a capacitor;

a reference resistor coupled to the capacitor;

first charging means coupled to the reference resistor and to the capacitor for charging said capacitor from a first predetermined charge level to a second predetermined charge level through said reference resistor;

timing means coupled to the capacitor for measuring the length of time required to charge said capacitor to said second predetermined level to obtain a reference charge time;

discharge means coupled to the capacitor for discharging said capacitor to said first predetermined charge level;

second charging means coupled to the thermistor and to the capacitor for charging said capacitor to said second predetermined charge level through said thermistor, said timing means measuring the length of time required to charge said capacitor to said second predetermined level to obtain a thermistor charge time; and computing means for computing the difference between the reference charge time and the thermistor charge time, the difference being divided by the sum of the reference charge time and the thermistor charge time to determine the temperature to which the thermistor is exposed.

5. An apparatus for determining the temperature to which a thermistor is exposed, comprising:

a capacitor having one end coupled to a voltage source, and another end coupled to said thermistor;

a reference resistor coupled to the other end of the capacitor;

sequential charging means coupled to the reference resistor, the thermistor and the capacitor for sequentially charging the capacitor to a predetermined value by the voltage source through the resistor and the thermistor;

timing means coupled to the capacitor for measuring the lengths of time required to sequentially charge the capacitor through the reference resistor and the thermistor to obtain a reference charge time and a thermistor charge time, respectively; and computing means for computing the difference between the reference charge time and the thermistor charge time with the difference being divided by the sum of the reference charge time and the thermistor charge time to obtain a value proportional to the temperature to which the thermistor is exposed, such value being substantially independent of leakage of the capacitor.

*6. A method of determining the temperature to which a temperature sensor is exposed, comprising the steps of:*

*providing a reference resistor;*

*providing a capacitor;*

*providing means for charging the capacitor a predetermined amount sequentially through the reference resistor and the temperature sensor;*

*the capacitor by the predetermined amount a first time through the reference resistor to obtain a first indication of the time required to charge the capacitor by the predetermined amount;*

*charging the capacitor by the predetermined amount a second time through the temperature sensor to obtain a second indication of the time required to charge the capacitor by the predetermined amount; and*

*comparing the first indication to the second indication to determine the temperature to which the sensor is exposed.*

*7. The method of claim 6, wherein the comparing step includes the step of computing the temperature from the first and second indications in a microcomputer.*

*8. The method of claim 6, wherein the step of charging the capacitor by the predetermined amount a first time and the step of charging the capacitor by the predetermined amount a second time each includes the step of increasing the voltage on the capacitor from a first level to a second level.*

*9. The method of claim 6, including the further step of discharging the capacitor after the first indication has been obtained and before the capacitor is charged through the temperature sensor.*

*10. The method of claim 6, in which a second temperature sensor is exposed to a different temperature, including the further steps of charging the capacitor through the second temperature sensor to obtain a third indication of the time required to charge the capacitor by the certain amount and using the first and third indications to obtain a measure of the different temperature.*

*11. A method of determining the temperature to which a thermistor is exposed utilizing a capacitor, a reference resistor, means coupled to the capacitor and actuable to selectively charge the capacitor through either of the reference resistor and the thermistor, means actuable to discharge the capacitor and timing means coupled to the capacitor, comprising the steps of:*

*(a) actuating the charging means to charge the capacitor through the reference resistor;*

*(b) operating the timing means to measure the length of time required to charge said capacitor to a predetermined level to obtain a reference charge time;*

*(c) actuating the discharging means to discharge the capacitor;*

*(d) actuating the charging means to charge said capacitor through said thermistor;*

*(e) operating the timing means to measure the length of time required to charge said capacitor to said predetermined level through said thermistor to obtain a temperature charge time; and*

(f) computing a value of the temperature to which the thermistor is exposed using the reference charge time and the temperature charge time whereby such value is independent of the capacitance value of the capacitor.

12. A method of determining the temperature to which a thermistor is exposed utilizing a capacitor, a reference resistor, means coupled to the capacitor and actuable to selectively charge the capacitor through either of the reference resistor and a thermistor, means actuable to discharge the capacitor and timing means coupled to the capacitor, comprising the steps of:

(a) actuating the charging means to charge the capacitor through the reference resistor;

(b) operating the timing means to measure the length of time required to charge said capacitor to a predetermined level to obtain a reference charge time;

(c) actuating the discharging means to discharge the capacitor;

(d) actuating the charging means to charge said capacitor through said thermistor;

(e) operating the timing means to measure the length of time required to charge said capacitor to said predetermined level through said thermistor to obtain a temperature charge time; and (f) comparing the reference charge time to the temperature charge time to determine the temperature to which the thermistor is exposed.

13. A method of determining the temperature to which a thermistor is exposed in a temperature control system for a space cooling device having an evaporator, an evaporator fan, a compressor, control means including a microcomputer, a capacitor and a reference resistor, the microcomputer including charging means selectively actuable to charge the capacitor through either of the reference resistor and the thermistor, discharging means actuable to discharge the capacitor and timing means coupled to the capacitor, comprising the steps of:

(a) actuating the charging means to charge the capacitor through the reference resistor;

(b) operating the timing means to measure the length of time required to charge said capacitor to a predetermined level to obtain a reference charge time input for said microcomputer;

(c) actuating the discharging means to discharge the capacitor;

(d) actuating the charging means to charge said capacitor through said thermistor;

(e) operating the timing means to measure the length of time required to charge said capacitor to said predetermined level through said thermistor to obtain a temperature charge time input for said microcomputer; and (f) computing in said microcomputer a value of the temperature to which said thermistor is exposed as a function of the reference charge time and the temperature charge time using an algorithm that is independent of the capacitance value of said capacitor.

14. A method of determining the temperature to which a thermistor is exposed in a temperature control system for a space cooling device having an evaporator, an evaporator fan, a compressor, control means including a microcomputer, a capacitor and a reference resistor, the microcomputer including charging means selectively actuable to charge the capacitor through either of the reference resistor and the thermistor, discharging means actuable to discharge the capacitor and timing means coupled to the capacitor, comprising the steps of:

(a) actuating the charging means to charge the capacitor through the reference resistor;

(b) operating the timing means to measure the length of time required to charge said capacitor to a predetermined level to obtain a reference charge time input for said microcomputer;

(c) actuating the discharging means to dishcharge the capacitor;

(d) actuating the charging means to charge said capacitor through said thermistor;

(e) operating the timing means to measure the length of time required to charge said capacitor to said predetermined level through said thermistor to obtain a temperature charge time input for said microcomputer; and (f) comparing in said microcomputer the reference charge time to the temperature charge time to determine the temperature to which the thermistor is exposed.

15. A method of determining the temperature to which a thermistor is exposed in a temperature control system for a space cooling device having an evaporator, an evaporator fan, a compressor, control means including a microcomputer, a capacitor and a reference resistor, the microcomputer including charging means selectively actuable to charge the capacitor through either of the reference resistor and the thermistor, discharging means actuable to discharge the capacitor and timing means coupled to the capacitor, comprising the steps of:

(a) actuating the charging means to charge the capacitor through the reference resistor;

(b) operating the timing means to measure the length of time required to charge said capacitor to a predetermined level to obtain a reference charge time input for said microcomputer;

(c) actuating the discharging means to discharge the capacitor;

(d) actuating the charging means to charge said capacitor through said thermistor;

(e) operating the timing means to measure the length of time required to charge said capacitor to said predetermined level through said thermistor to obtain a temperature charge time input for said microcomputer; and (f) computing in said microcomputer a value of the temperature to which said thermistor is exposed as a function of the reference charge time and the temperature charge time using an algorithm that is independent of the capacitance value of said capacitor and the voltage of said charging means.

16. An apparatus for determining the temperature to which a thermistor is exposed, comprising:

a capacitor;

a reference resistor;

sequential charging means coupled to the capacitor, the thermistor and the reference resistor for sequentially charging the capacitor by a predetermined charge amount through the reference resistor and the thermistor;

timing means coupled to the capacitor for measuring the length of time required to charge the capacitor by the predetermined charge amount through the reference resistor and the thermistor to obtain a reference resistor charge time and a thermistor charge time, respectively; and computing means for computing the temperature to which the thermistor is exposed responsive to the reference charge time and the thermistor charge time.

*17. The apparatus of claim 16, wherein the computing means comprises a microcomputer.*

*18. The apparatus of claim 16, wherein the sequential charging means includes a first series circuit comprising the reference resistor, the capacitor and a voltage source and a second series circuit comprising the thermistor, the capacitor and the voltage source.*

*19. The apparatus of claim 17, wherein the capacitor is coupled to an input of the microcomputer and wherein the timing means senses the voltage developed at the microprocessor input.*

* * * * *